Nov. 23, 1926.

G. C. THOMAS, JR 1,608,011

CABLE CONNECTER

Filed Jan. 22. 1924

INVENTOR
George C. Thomas, Jr.
by
Bohleber & Ledbetter
ATTORNEYS

Patented Nov. 23, 1926.

1,608,011

UNITED STATES PATENT OFFICE.

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed January 22, 1924. Serial No. 687,779.

This invention relates to cable connecters for use in joining electric cables to outlet box fixtures and the like.

An object of the invention is to produce an improved cable connecter of simple structure capable of being economically manufactured and which is simple and easy to insert within the outlet fixture box and which positively functions to secure cable to said box. Likewise it is an object to produce a cable connecter which fits the round knock-out holes of standard boxes in present-day use.

The accompanying drawing illustrates a preferred form of the invention, the construction and operation of parts of which may be suitably varied or modified to meet the manufacturer's and user's requirements without departing from the scope and principle of my invention.

Figure 1:
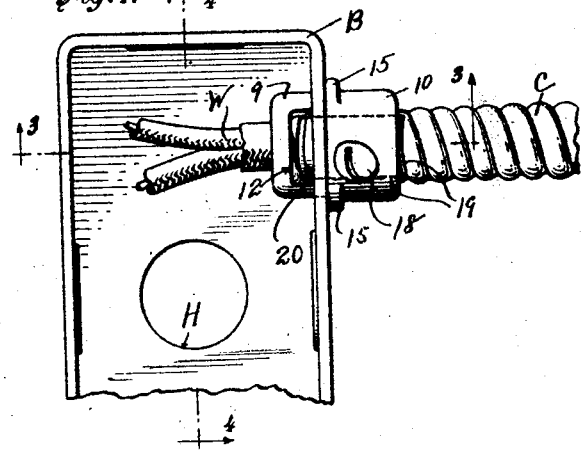
Figure 1 illustrates a top view of an electric fixture box with a cable joined thereto through the agency of my improved connecter.
Figure 2:
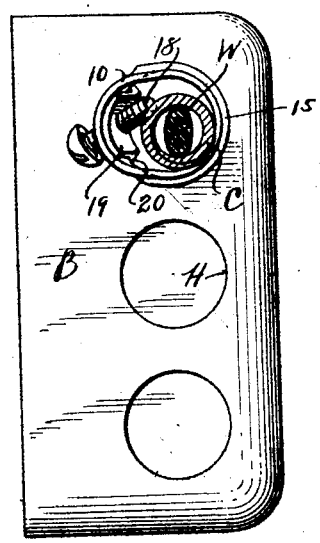
Figure 2 shows an outside elevation thereof as projected from the side of Figure 1.

Referring now more particularly to the drawings for a more detailed description of the invention and with particular reference to the structure of the cable connecter itself, there is shown a sleeve, one end 9 of which is of substantially true cylindrical form in order that it may effect a close-sliding fit within the knock-out hole H of a fixture box B; and the other end 10 of this sleeve is substantially oblong or elliptical in form, thus providing a sleeve of composite round and oblong shape. The lower half of the integral sleeve walls 9 and 10 join in alignment while the opposite wall of the oblong portion 10 projects above the cylindrical end 9 thereby affording a shoulder abutment 11 which bears against the wall of the box B.

The connecter shown is designed to be fitted into the box from the outside thereof, but structural modifications may readily be made to adapt the connecter to be inserted from the inside of the box. It is observed therefore how the abutment 11 bears against the outside box wall when the box, connecter, and cable are all assembled. The connecter sleeve 9—10 is cut or cored out to form a box hole edge locking slot or opening 12 adjacent the end of the abutment 11, and this gap or slot removes a portion of the wall 9 of the connecter sleeve as well as all or most all of the vertical wall rising above the sleeve end 9, thereby affording means, as will be explained, to anchor the connecter to the box knock-out H. The opening 12 is co-extensive with the cylindrical end 9 and oblong end 10.

The smaller end 9 is cast with a shoulder bushing 14 against which the cable end C rests; and the bushing 14 acts as a guard and a guide through which the insulated electrical wires W pass and are pulled or manipulated without being abraded or damaged in pushing the wires therethrough incident to making electric connections in a fixture or outlet box. The sleeve connecter is made with an abutment rib 15 which is preferably formed on the wall at the juncture of the cylindrical end 9 and oblong or elliptical end 10; and this rib 15 stands above the sleeve wall 9—10 for a substantial distance therearound after which the said rib merges with and forms a continuation of the abutment shoulder 11, the structure being so arranged that the said abutment shoulders 11 and edge of the rib 15 facing the box are in alignment and form substantially one continuous rib around the sleeve. This structure affords a firmly seated connecter capable of rigid anchorage to the box and impossible of sidewise or wobbling motion.

The connecter sleeve is made with a hole 17 in the upper oblong sleeve extension or in the projected oblong structure; and a clamp screw 18 is carried freely in the hole, the said screw being adapted to move up and down in the hole as the parts are assembled. A connecter anchorage hook and clamp plate 19 is screw threaded to the clamp screw 18; and this plate carries an upturned hook or curved end 20 which moves up and down within the box hole edge entry slot 12. The hook end 20 clears both edges of the slot 12 and is spaced from the shoulder 11 in order that the said hook be disposed well within the interior of the box when the parts are assembled, for the hook is designed to reach around the box hole edge H and engage the inner side thereof. The screw 18 is passed through the hook and clamp plate and the lower screw end bears or bites into the cable C to anchor it in the connecter. This clamp plate may preferably be circular in cross section to conform to the circular wall of the oblong portion of the sleeve; and the clamp screw itself may preferably be angularly disposed in the clamp plate in order that, as the screw is driven inwardly, it will approach and tangentially bite into the cable wall C thus anchoring the cable in the sleeve. The clamp plate 19 is of simple structure and may comprise an ordinary stamping capable of being blanked or struck from sheet material thereby reducing production costs in manufacturing the article.

Figure 3:
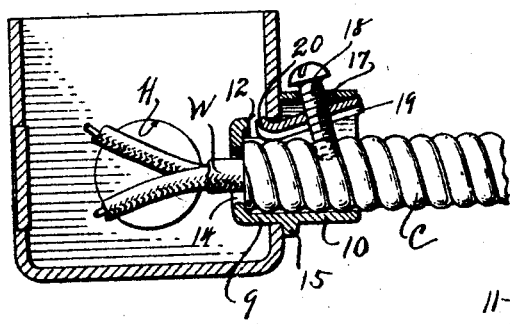
Figure 3 illustrates a longitudinal section on the line 3—3 of Figure 1.
Figure 4:
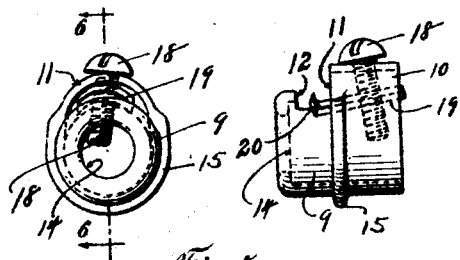
Figure 4 illustrates an inside view developed on the line 4—4 of Figure 1.
Figure 4:
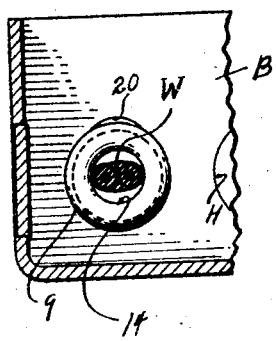
Figure 6:
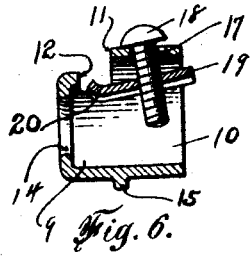
Figure 6 shows a sectional view taken on the line 6—6 of Figure 5.
Figure 5:
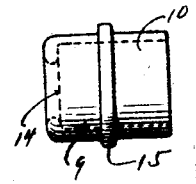
Figure 5 is a cluster view of the cable connecter illustrating the three major projections thereof.

The connecter is assembled within an outlet box and with a cable by disposing the cable end C and connecter end 9 in the box knock-out H with the hook of the clamp plate embracing the box edge as shown in Figure 3. The mechanic now turns the clamp screw 18 downwardly against the cable C, the screw biting into the cable and anchoring it to the sleeve 9—10 and simultaneously therewith the clamp 19 assumes an angular relation with the axis of the connecter whereby the outer end of the clamp plate pivotally rests against the oblong wall of the connecter and the inner hook end 20 thereof forcibly moves under great pressure outwardly through the opening 12 against the periphery of the knock-out hole H. The screw 18 functions to simultaneously anchor the cable to the connecter and the connecter to the box.

The design of the sleeve connecter enables the part to be cast, and the screw and clamp plate are readily assembled therewith thus providing a connecter of simple structure and possessed of strength and ability to positively join armored cables to boxes.

What I claim is:

1. A connecter comprising a sleeve to receive a cable including a cylindrical end joining an elliptical end and having a box hole edge entry slot formed in the sleeve at the juncture of the cylindrical and elliptical ends, an anchorage plate carried within the sleeve with one end resting against an end of the sleeve, a hook made on the other end of the anchorage plate which projects through the aforesaid box hole edge entry slot to engage a box hole edge, a screw passed freely through the sleeve and threaded into the plate to draw the hook against a box hole edge aforesaid as the other end of the plate rests against the sleeve, and means on the sleeve to abut a box wall.

2. A connecter comprising a sleeve, a full-circular bushing included at one end through which wires pass and against which a cable rests, said sleeve having an opening adjacent the bushing which affords entry of a box hole edge into the sleeve, an abutment on the sleeve which rests against a box wall when the connecter is placed in a box hole, an anchorage plate mounted in the sleeve one end of which includes means to engage a box hole edge protruding through the sleeve opening adjacent the bushing, and a screw mounted on the sleeve threading into the plate and through it to engage a cable and simultaneously bear the anchorage plate against a box hole edge.

In testimony whereof I affix my signature.

GEORGE C. THOMAS, JR.